United States Patent

Duchardt et al.

[11] 4,296,044
[45] Oct. 20, 1981

[54] PROCESS FOR THE PREPARATION OF CATIONIC ANTHRAQUINONE DYESTUFFS

[75] Inventors: Karl H. Duchardt; Günter Gehrke, both of Cologne, Fed. Rep. of Germany

[73] Assignee: Bayer Aktiengesellschaft, Leverkusen, Fed. Rep. of Germany

[21] Appl. No.: 117,170

[22] Filed: Jan. 31, 1980

[30] Foreign Application Priority Data

Feb. 17, 1979 [DE] Fed. Rep. of Germany ....... 2906132

[51] Int. Cl.³ ............................................. C07C 97/25
[52] U.S. Cl. .................................................... 260/381
[58] Field of Search ........................................ 260/381

[56] References Cited

U.S. PATENT DOCUMENTS 3,123,605  3/1964  Turetzky et al. .................. 260/381

FOREIGN PATENT DOCUMENTS 1150652  6/1963  Fed. Rep. of Germany .
2740342  3/1978  Fed. Rep. of Germany .

*Primary Examiner*—Winston A. Douglas
*Assistant Examiner*—Raymond Covington
*Attorney, Agent, or Firm*—Sprung, Felfe, Horn, Lynch & Kramer

[57] ABSTRACT

Cationic anthraquinone dyestuffs of the formula

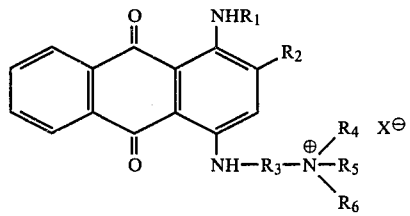

wherein
$R_1$ denotes hydrogen, alkyl or cycloalkyl,
$R_2$ denotes hydrogen, alkyl or bromine,
$R_3$ denotes alkylene,
$R_4$ and $R_5$ denote alkyl, aryl or aralkyl,
$R_6$ denotes alkyl or aralkyl and
$X^\ominus$ denotes an anion, and the substituents mentioned can in turn be substituted by non-ionic radicals, are prepared by reacting anthraquinones of the formula

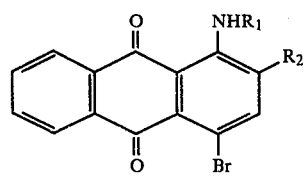

with amines of the formula

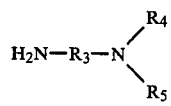

in the presence of a proton acceptor and of copper salts as a catalyst, in a solvent mixture consisting of 50 to 90% of one or more aprotic, non-polar or slightly polar solvents and 10 to 50% of one or more protic or aprotic, polar solvents, trapping the acid formed during the reaction by bases which do not precipitate the catalyst and then quaternizing the product, without intermediate isolation.

9 Claims, No Drawings

PROCESS FOR THE PREPARATION OF CATIONIC ANTHRAQUINONE DYESTUFFS

The invention relates to a process for the preparation of cationic anthraquinone dyestuffs of the formula

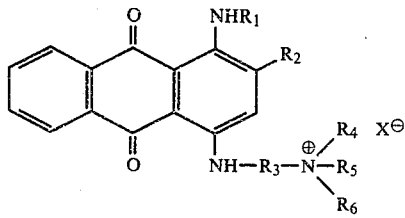

wherein
$R_1$ denotes hydrogen, alkyl or cycloalkyl,
$R_2$ denotes hydrogen, alkyl or bromine,
$R_3$ denotes alkylene,
$R_4$ and $R_5$ denote alkyl, aryl or aralkyl,
$R_6$ denotes alkyl or aralkyl and
$X^\ominus$ denotes an anion, and the substituents mentioned can in turn be substituted by non-ionic radicals, by reacting anthraquinones of the formula

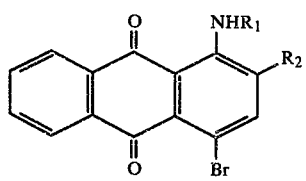

with amines of the formula

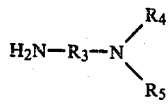

wherein the substituents have the abovementioned meaning,
in the presence of a proton acceptor and of copper salts as a catalyst, and subsequently quaternising the product with compounds of the formula $R_6$—X without intermediate isolation. The process is characterised in that the reaction of (II) and (III) is carried out in a solvent mixture consisting of 50 to 90% of one or more aprotic, non-polar or slightly polar solvents and 10 to 50% of one or more protic or aprotic, polar solvents, and bases which do not precipitate the catalyst are used to trap the acid formed during the reaction.

The alkyl radicals preferably have 1 to 6 carbon atoms and the alkylene radical preferably has 2 to 4 carbon atoms. In particular, aryl is understood as phenyl, aralkyl is understood as benzyl and cycloalkyl is understood as cyclopentyl or cyclohexyl.

Examples of suitable non-ionic radicals are halogen, such as fluorine, chlorine or bromine, cyano, hydroxyl and acetoxy, and, for cyclic substituents, also $C_1$–$C_4$-alkyl or nitro.

In preferred anthraquinone dyestuffs of the formula (I), $R_1$ denotes hydrogen, $C_1$–$C_6$-alkyl or cyclohexyl which is optionally substituted by methyl, $R_2$ denotes hydrogen, methyl or bromine,
$R_3$ denotes $C_2$–$C_4$-alkylene,
$R_4$ and $R_5$ denote $C_1$–$C_4$-alkyl or phenyl or benzyl which is optionally substituted by chlorine or methyl,
$R_6$ denotes $C_1$–$C_4$-alkyl which is optionally substituted by OH, or benzyl which is optionally substituted by chlorine or methyl, and
X-denotes an anion.

Examples of possible anthraquinones of the formula (I) are: 1-amino-4-bromo-anthraquinone, 1-methylamino-4-bromo-anthraquinone, 1-ethylamino-4-bromoanthraquinone, 1-t-butylamino-4-bromo-anthraquinone, 1-t-amylamino-4-bromo-anthraquinone, 1-cyclohexylamino-4-bromoanthraquinone, 1-amino-2,4-dibromoanthraquinone, 1-methylamino-2,4-dibromo-anthraquinone, 1-amino-4-bromo-2-methyl-anthraquinone and 1-methylamino-4-bromo-2-methyl-anthraquinone.

Examples of suitable amines of the formula (III) are: N,N-dimethyl-1,2-diaminoethane, N-benzyl-N-methyl-1,2-diaminoethane, N-methyl-N-phenyl-1,2-diaminoethane, N,N-dimethyl-1,3-diaminopropane, N-benzyl-N-methyl-1,3-diaminopropane and N-methyl-N-phenyl-1,3-diaminopropane.

Particularly suitable quaternising agents are: dimethyl sulphate, diethyl sulphate and benzyl chloride.

Suitable aprotic non-polar or slightly polar solvents are, above all, aromatic hydrocarbons, which can be substituted by chlorine or nitro, such as toluene, xylene, chlorobenzene, o-dichlorobenzene and nitro-benzene.

Preferred protic polar solvents are aliphatic alcohols, such as methanol, ethanol and propanol, optionally with the addition of small proportions of water.

Preferred aprotic polar solvents are pyridine and sulpholane.

The solvents are used in a mixture which contains the protic or aprotic, polar solvent to the extent of 10–20% and the aprotic, non-polar or slightly polar solvent to the extent of 80–90%. Mixtures which have the abovementioned composition and also contain 1–2% of water are particularly preferred.

Alkali metal carbonates and bicarbonates can be used as the bases.

The process according to the invention is carried out at the boiling point of the solvent mixture. Temperatures of 50°–100° C., in particular 70°–80° C., are preferred.

The reaction of bromoanthraquinones with amines in the presence of copper salts, for example the chloride or acetate, as a catalyst to give anthraquinone dyestuffs of the formula (I) is already known from German Patent Specification No. 1,150,652 and DE-OS (German Published Specification No. 2,740,342.

It has now been found that using a particular solvent mixture having the composition described above improves the selectivity of the reaction if suitable proton acceptors are employed. These proton acceptors are to be chosen such that the dissolved copper salt is not precipitated as the hydroxide by forming a complex with the amine. Compared with the process described in DE-OS (German Published Specification) No. 2,730,342, Example 2, an increase in yield of 10% is achieved by this homogeneous catalysis. In comparison with the process described in German Patent Specification No. 1,150,652, a product of higher quality is obtained in a yield which is improved by 30%.

EXAMPLE 1

118.5 g of 1-methylamino-4-bromo-anthraquinone are suspended in a mixture of 300 ml of o-dichlorobenzene and 45 ml of methanol and, after adding 27 g of crystal carbonate, 54 ml of N,N-dimethyl-1,3-diaminopropane and 1.2 g of copper-I chloride, the mixture is heated under reflux (75°–80° C.) until all the starting material has been consumed. Methanol, excess amine and water are then distilled off, finally in vacuo. After making up to 450 ml with o-dichlorobenzene, the mixture is washed three times with water and the organic phase is made up to 700 ml and distilled until all water has been removed. The reaction mixture is cooled to 60° C., 13 ml of methanol are added and quaternisation is carried out with 38 ml of dimethyl sulphate at 60° C. 167 g (96%) of dyestuff are obtained.

If the anthraquinones listed in Table 1 are reacted with the amines, also mentioned in the table, as described in Example 1 and the products are then quaternised with the quaternising agents given in the table, other cationic dyestuffs, some of which are known, of the formula I are obtained.

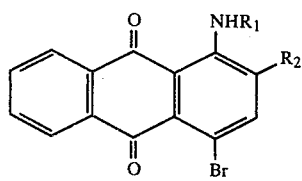

with amines of the formula

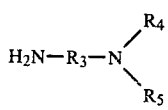

in the presence of proton acceptors and copper salts as a catalyst, and subsequently quaternising the product with compounds of the formula $R_6$—X without intermediate isolation, the improvement which comprises carrying out the reaction of the 4-bromoanthraquinone with the amine in a solvent mixture consisting of 50–90% of one or more aprotic, non-polar or slightly polar solvents and 10–50% of one or more protic or aprotic, polar solvents, and in the presence of a base which does not precipitate the catalyst so as to trap the acid formed during the reaction.

2. Process according to claim 1, characterised in that those anthraquinone dyestuffs of the formula of claim 1 wherein
  $R_1$ denotes hydrogen, $C_1$–$C_6$-alkyl or cyclohexyl which is optionally substituted by methyl,
  $R_2$ denotes hydrogen, methyl or bromine,
  $R_3$ denotes $C_2$–$C_4$-alkylene,
  $R_4$ and $R_5$ denote $C_1$–$C_4$-alkyl or phenyl or benzyl which is optionally substituted by chlorine or methyl,
  $R_6$ denotes $C_1$–$C_4$-alkyl which can be substituted by OH, or benzyl which is optionally substituted by chlorine or methyl, and
  $X^\ominus$ denotes an anion, are prepared.

3. Process according to claim 1, characterised in that 1-amino-4-bromoanthraquinone, 1-amino-2,4-dibromoanthraquinone, 1-methylamino-4-bromoanthraquinone or 1-methylamino-2,4-dibromoanthraquinone is used as the 4-bromo-anthraquinone.

TABLE 1

| Example No. | $R_1$ | $R_2$ | $R_3$ | $R_4$ | $R_5$ | Quaternising agent | $R_6$ |
|---|---|---|---|---|---|---|---|
| 2 | H | H | —(CH$_2$)$_3$— | —CH$_3$ | —CH$_3$ | (CH$_3$)$_2$SO$_4$ | CH$_3$ |
| 3 | C$_2$H$_5$ | H | —(CH$_2$)$_2$— | —CH$_3$ | —CH$_3$ | (CH$_3$)$_2$SO$_4$ | CH$_3$ |
| 4 | C(CH$_3$)$_3$ | H | —(CH$_2$)$_3$— | —CH$_3$ | —CH$_3$ | ⟨C$_6$H$_4$⟩—CH$_2$Cl | CH$_2$—⟨C$_6$H$_5$⟩ |
| 5 | C(CH$_3$)$_2$C$_2$H$_5$ | H | —(CH$_2$)$_2$— | —CH$_3$ | —C$_6$H$_5$ | (C$_2$H$_5$)$_2$SO$_4$ | C$_2$H$_5$ |
| 6 | ⟨C$_6$H$_{11}$⟩ | H | —(CH$_2$)$_3$— | —CH$_3$ | —C$_6$H$_5$ | ⟨C$_6$H$_4$⟩—CH$_2$Cl | CH$_2$—⟨C$_6$H$_5$⟩ |
| 7 | H | Br | —(CH$_2$)$_3$— | —CH$_3$ | —CH$_3$ | (CH$_3$)$_2$SO$_4$ | CH$_3$ |
| 8 | CH$_3$ | Br | —(CH$_2$)$_3$— | —CH$_3$ | —CH$_3$ | (CH$_3$)$_2$SO$_4$ | CH$_3$ |
| 9 | H | CH$_3$ | —(CH$_2$)$_2$— | —CH$_3$ | —CH$_3$ | (CH$_3$)$_2$SO$_4$ | CH$_3$ |
| 10 | CH$_3$ | CH$_3$ | —(CH$_2$)$_3$— | —CH$_3$ | —CH$_3$ | ⟨C$_6$H$_4$⟩—CH$_2$Cl | CH$_2$—⟨C$_6$H$_5$⟩ |

We claim:
1. In the preparation of cationic anthraquinone dyestuffs of the formula

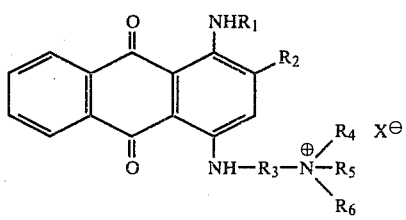

wherein
  $R_1$ denotes hydrogen, alkyl or cycloalkyl,
  $R_2$ denotes hydrogen, alkyl or bromine,
  $R_3$ denotes alkylene,
  $R_4$ and $R_5$ denote alkyl, aryl or aralkyl,
  $R_6$ denotes alkyl or aralkyl and
  $X^\ominus$ denotes an anion,
by reacting a 4-bromoanthraquinone of the formula 4. Process according to claim 1, characterised in that N,N-dimethyl-1,2-diaminoethane, N-methyl-N-phenyl-1,2-diaminoethane, N,N-dimethyl-1,3-diaminopropane or N-methyl-N-phenyl-1,3-diaminoethane is used as the amine.

5. Process according to claim 1, characterised in that dimethyl sulphate, diethyl sulphate or benzyl chloride is used as the quaternising agent.

6. Process according to claim 1, characterised in that a mixture of toluene, xylene, chlorobenzene, o-dichlorobenzene or nitrobenzene and methanol, ethanol, methanol containing 10-15% of water or ethanol containing 10-15% of water is used as the solvent mixture.

7. Process according to claim 1, characterised in that o-dichlorobenzene containing 10-15% of methanol and 1-1.5% of water is used as the solvent mixture and sodium carbonate is used as the proton acceptor.

8. Process according to claim 1, characterised in that N,N-dimethyl-1,3-diaminopropane is used as the amine.

9. Process according to claim 1, characterised in that 1-methylamino-4-bromo-anthraquinone is used as the anthraquinone and dimethyl sulphate is used as the quaternising agent.

* * * * *